United States Patent [19]

Tien

[11] Patent Number: 4,886,768

[45] Date of Patent: Dec. 12, 1989

[54] TOUGHENED CERAMICS

[75] Inventor: Tseng-Ying Tien, Ann Arbor, Mich.

[73] Assignee: Board of Regents Acting for and on Behalf of University of Michigan, Ann Arbor, Mich.

[21] Appl. No.: 120,600

[22] Filed: Nov. 13, 1987

[51] Int. Cl.$^4$ .............................................. C04B 35/48
[52] U.S. Cl. ................................... 501/104; 501/103; 501/152
[58] Field of Search ...................... 501/104, 103, 152

[56] References Cited

U.S. PATENT DOCUMENTS

| | | | |
|---|---|---|---|
| 3,634,113 | 1/1972 | Fehrenbacher | 501/103 |
| 4,053,321 | 11/1977 | Okumiya et al. | |
| 4,406,699 | 9/1983 | Beck et al. | 75/233 |
| 4,421,861 | 12/1983 | Claussen et al. | 501/103 |
| 4,507,394 | 3/1985 | Mase et al. | 501/94 |
| 4,520,114 | 5/1985 | David | 501/12 |
| 4,533,647 | 8/1985 | Tien | 501/105 |
| 4,598,053 | 7/1986 | Yamakawa et al. | 501/104 |
| 4,621,936 | 11/1986 | Hansson et al. | 401/215 |
| 4,627,892 | 12/1986 | Worrell et al. | 204/1 T |

FOREIGN PATENT DOCUMENTS

| | | |
|---|---|---|
| 199459 | 10/1986 | European Pat. Off. |
| 59-152266 | 8/1984 | Japan ................................. 501/103 |
| 61-242954 | 10/1986 | Japan . |
| 61-242955 | 10/1986 | Japan . |
| 62-46959 | 2/1987 | Japan . |
| 525642 | 8/1976 | U.S.S.R. ............................... 501/103 |

OTHER PUBLICATIONS

Choudhary et al, Electrical Conduction in the Cubic Fluorite Phase in the System $ZrO_2-YO_{1.5}-TaO_{2.5}$(1979).

Jordan et al, Phase Distribution in the $HfO_2-Er_2O_3-Ta_2O_5$ System (1985).

*Primary Examiner*—Mark L. Bell
*Assistant Examiner*—Anthony J. Green
*Attorney, Agent, or Firm*—Robert B. Stevenson

[57] ABSTRACT

Novel partially stabilized zirconia ceramic compositions exhibiting improved toughness comprising: a major component consisting of $ZrO_2$, a minor stabilizing component $Y_2O_3$ and an effective amount of a toughening agent (e.g., $Ta_2O_5$). The toughness of the tetragonal zirconia polycrystal (e.g., 96% $ZrO_2$, 3 mole % $Y_2O_3$) can be increased nearly three-fold by replacing 1% of the $ZrO_2$ with $Ta_2O_5$. Empirical equations based on ratios of fundamental lattice parameters (e.g. c/a) quantitatively relating to the stability/instability of tetragonal zirconia oxide are disclosed and used in a novel method for improving the toughness of the ceramic compositions.

9 Claims, 5 Drawing Sheets

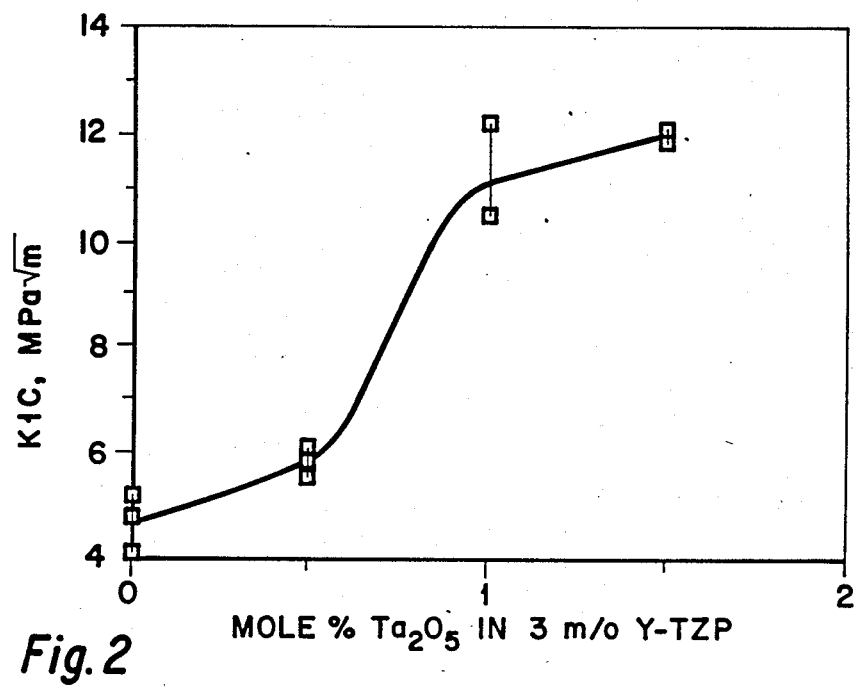
Fig. 2
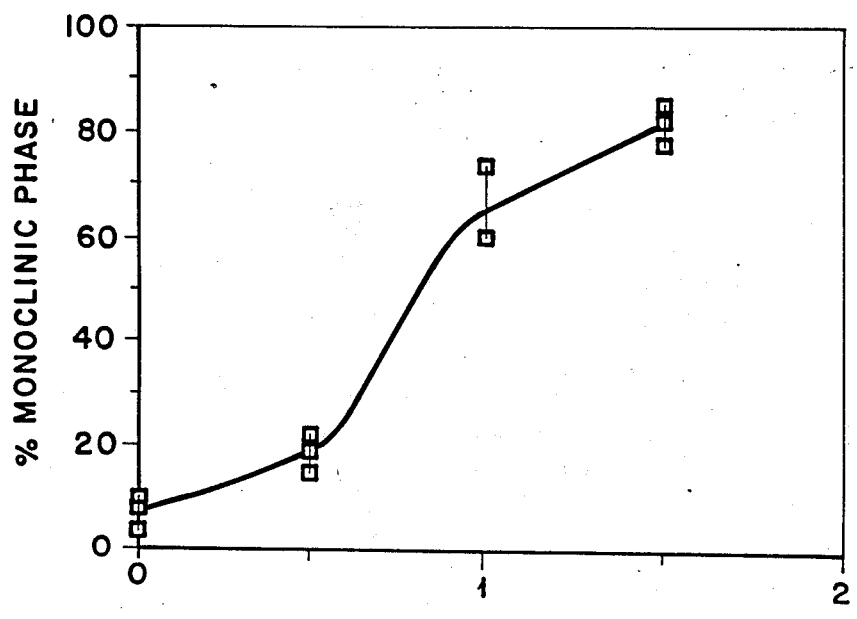
Fig. 3   MOLE % Ta O  IN 3 m/o Y-TZP

TOUGHENED CERAMICS

BACKGROUND OF THE INVENTION

1. Field of the Invention

This invention relates to improved ceramic compositions and a method of toughening zirconia ceramics. More specifically, but not by way of limitation, this invention relates to the alloying effect on transformability of yttrium stabilized tetragonal zirconia polycrystals, Y-TZP.

2. Description of the Prior Art

It is generally known that zirconium dioxide (zirconia) exists in three allotropic forms; monoclinic, tetragonal and cubic and that there is a large volume expansion during the transition from tetragonal to monoclinic. Further, it has been historically accepted that because of this disruptive phase transition, the refractory properties of pure zirconia cannot be used. However, recent developments relating to suppressing or disrupting the deleterious effects of the phase transition have been discovered. For example, in the so-called partially stabilized zirconia (PSZ), the addition of metal oxide is viewed as creating a multiphase material having a fine-scale precipitate of tetragonal zirconia in a stabilized cubic matrix which in turn results in enhanced toughness and strength. More recently, an even more powerful strengthening mechanism has been suggested involving the toughening and retaining of the metastable tetragonal zirconia to room temperature. In this development, the martensitic transformation (fast and diffusionless) between monoclinic and tetragonal phases is partially alleviated by inducing and creating tetragonal zirconia in sintered bodies or domains of a resulting time-stabilized zirconia. Although these transformation stabilizing ceramic mechanisms and their underlying rationales may be questionable and although their respective effects on high temperature properties of the resulting transformation toughened ceramics are encouraging, the breadth of applicability of these general principles to the field of ceramics generally and the extent to which the properties can be improved is still not well defined or understood. Thus, the use of transformation toughened ceramics and ceramic coatings still remains uncertain.

SUMMARY OF THE INVENTION

Tetragonal, t, phase retention of $Y_2O_3$ stabilized t-$ZrO_2$ polycrystals, Y-TZP, depends on composition, grain size and density. The transformability of t-phase is defined as how easily the phase transforms to the monoclinic (m) symmetry. The ease of transformability contributes to high fracture toughness by virtue of an increased fraction of t-phase transforming to m-symmetry during the stress-induced transformation process. Since the martensitic t→m transformation are controlled by nucleation, ease of transformability is governed by the height of the nucleation barrier. Historically, most studies of the transformability of Y-TZP have been related to grain or particle size and shape to rationalize the instability of t-phase. In contrast, the methods and novel composition according to the present invention and their respective improved ceramic toughness is related to the presence of and effective amount of a metal oxide toughening agent and its corresponding alloying effect on the transformability of t-phase.

Thus the present invention provides a ceramic composition comprising:
(a) a major component consisting of $ZrO_2$;
(b) a minor stabilizing component selected from the group consisting of $Y_2O_3$, MgO, $Sc_2O_3$, $In_2O_3$ and rare earth oxides; and
(c) an effective amount of a toughening agent selected from the group consisting of $Ta_2O_5$, $Nb_2O_5$ and $HfO_2$.

The method according to the present invention for preparing a partially stabilized zirconia wherein a major component of $ZrO_2$ is stabilized by a minor component of a stabilizing agent selected from the group consisting of $Y_2O_3$, MgO, $Sc_2O_3$, $In_2O_3$ and rare earth oxides, comprises the step of adding an effecive amount of a toughening agent selected from the group consisting of $Ta_2O_5$, $Nb_2O_5$ and $HfO_2$.

A further method according to the present invention involves improving the ease of transformability of the t→m phase in stabilizing t-$ZrO_2$ polycrystal comprising the step of adding an amount of a transition metal oxide sufficient to cause the ratio of the lattice parameters c/a to increase.

It is an object of the present invention to provide toughened ceramic compositions. It is a further object to provide a method of improving the toughness of partially stabilized zirconias. It is still a further object to provide a toughening agent that affects the transformability of yttrium stabilized tetragonal zirconia polycrystal. It is also an object of the invention to achieve the toughening by virtue of the alloying effect of the additive. And it is still a further object of the present invention to provide a method of predicting the alloying effect and resulting improvement in toughness based on empirical equations that calculate ratios of lattice parameters for the $ZrO_2$ phases. Fulfillment of these objects and the presence and fulfillment of other objects will become apparent upon complete reading of the specification and claims taken in conjunction with the attached drawing.

BRIEF DESCRIPTION OF THE DRAWING

FIG. 2 is a plot of fracture toughness as a function of mole percent $Ta_2O_5$ of 3 mole % Y-TZP sintered for 1 hour at 1500° C.

FIG. 3 is a plot of the percent monoclinic phase (m-phase) on the fracture surface for 3 mole % Y-TZP sintered for 1 hour at 1500° C. as a function of mole percent $Ta_2O_5$.

DESCRIPTION OF THE PREFERRED EMBODIMENTS

Figure 1:
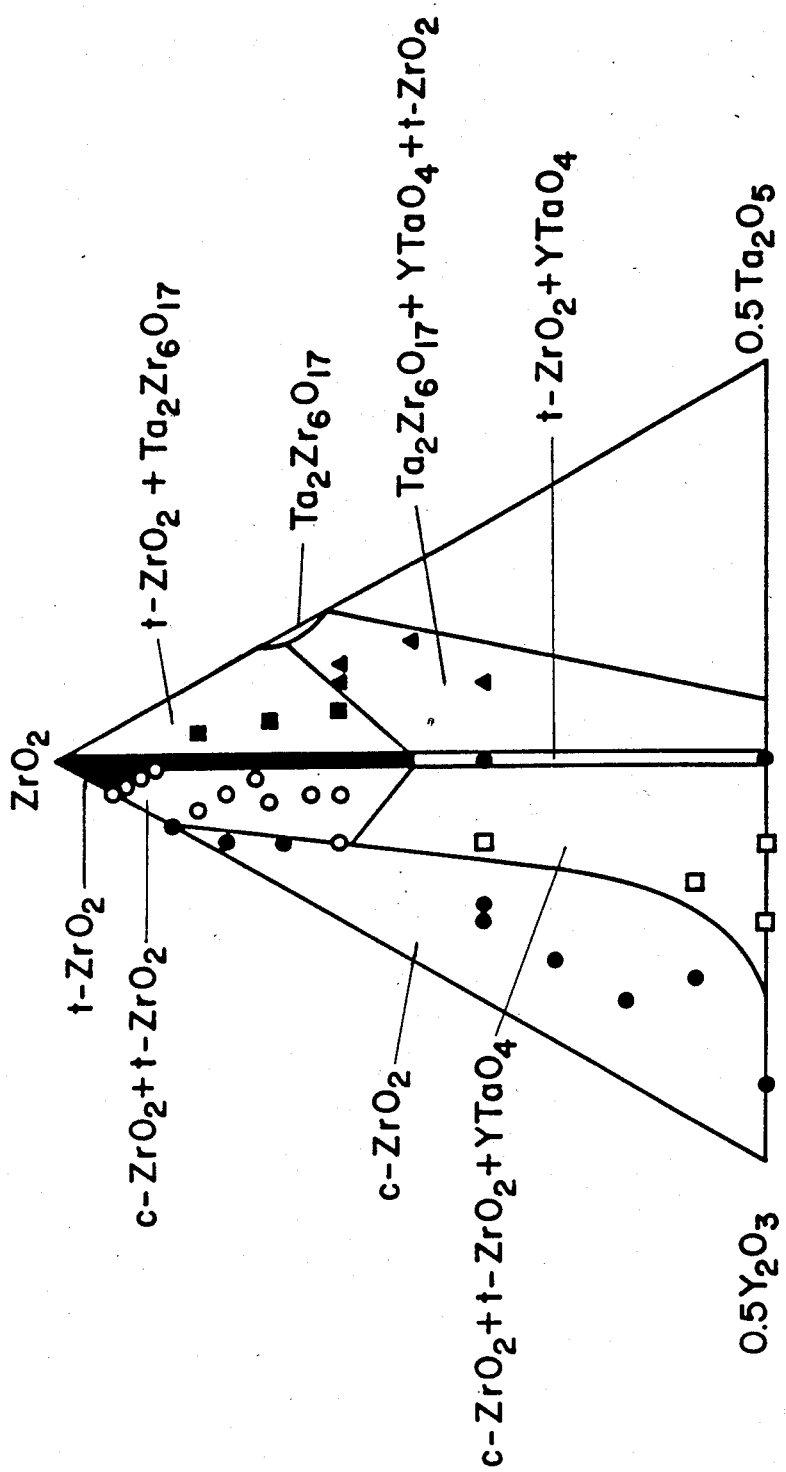
FIG. 1 illustrates part of the phase relations in the system $ZrO_2$-$Y_2O_3$-$Ta_2O_5$ at 1500° C.

As previously indicated above, the toughened ceramics according to the present invention employ an effective amount of a toughening agent, which creates through an alloying effect the desired improvement in the ceramic composition. The ceramics of the present invention include broadly the stabilized or partially stabilized zirconias that categorically involve tetragonal zirconia polycrystals, TZP. Typically, commercial TZP (e.g., $ZrO_2$ containing 3 mole % of $Y_2O_3$) has a toughness of 7 $MN/m^{3/2}$ and a bend strength of 1000 MPa. The addition of the toughening agent of the present invention has developed materials which have a toughness of higher than 16 $MN/m^{3/2}$ and comparable bend strength.

The actual method of incorporating the toughening agent into the ceramic composition can be by any such method as generally known in the art. The quantity employed is typically a few mole percent; thus the toughening additive or agent is a minor constituent. The following examples are presented to further illustrate the methods and composition according to the present invention. For the most part, the examples primarily refer to the $Y_2O_3$-$ZrO_2$ system; however, the basic concepts of the invention are felt to apply to any ceramic composition involving the tetragonal zirconia polycrystals, and include by way of example but not limited thereto, the $MgO$-$ZrO_2$, $Sc_2O_3$-$ZrO_2$, $In_2O_3$-$ZrO_2$, $CeO_2$-$ZrO_2$ systems as well as other rare earth oxide (lanthanide oxides)-$ZrO_2$ systems. Similarly the metal oxide stabilizing additive illustrated in the example is primarily $Ta_2O_5$, but is felt to apply also to other metal oxide additives, again by way of example but not limited thereto, $Nb_2O_5$ and $HfO_2$. Preferably, the $ZrO_2$ is present at about 93 to about 97.5 mole percent, while the stabilizing compound is present at about 2 to about 4 mole percent and the toughening agent is present at about 0.5 to about 3 mole percent. Preferably, the ceramic composition according to the present invention comprises for every mole of $ZrO_2$ from about 0.01 to about 0.04 moles of $Y_2O_3$ and at least about 0.005 moles of $Ta_2O_5$.

The following examples are presented as being illustrative of the invention but not unduly limiting.

EXAMPLE I

In order to demonstrate the increased toughness associated with ceramic compositions according to the present invention, aqueous solutions of soluble zirconium, yttrium and tantalum salts were prepared separately and were then mixed at different ratios to achieve specific formulations listed below. The mixed solutions were then treated with an excess of ammonia in order to precipitate mixed metal hydroxides. The precipitates were washed and dried. The dried powders were then calcined and milled to break up large agglomerates. The powders were compacted and sintered in air. The specimens reached near theoretical density when sintered at about 1500° C. higher for one hour. The resulting ceramic compositions were then measured for fracture toughness. The resulting compositions and toughness data are presented in Table I.

TABLE I

| Composition, Mole % | | | Toughness, $MN/m^{3/2}$ |
| --- | --- | --- | --- |
| $ZrO_2$ | $Y_2O_3$ | $Ta_2O_5$ | |
| 97 | 3 | 0 | 6 |
| 96.5 | 3 | 0.5 | 6 |
| 96 | 3 | 1 | 17 |
| 95.5 | 3 | 1.5 | 15 |

As indicated in the data, the presence of approximately 1 mole % $Ta_2O_5$ results in a remarkable increase in toughness of the order of a three-fold increase in fracture toughness relative to the absence of $Ta_2O_5$. These results are attributed to the alloying effect of $Ta_2O_5$ on phase stability and transformability of Y-TZP and as indicated in the following Example II are viewed as a destabilization of the high temperature polymorphs of $ZrO_2$ making $Ta_2O_5$ categorically a destabilizer rather than a stabilizer (i.e., the $Ta_2O_5$ is felt to function mechanistically different from $Y_2O_3$).

EXAMPLE II

In a manner analogous to the above Example I, starting powders were prepared from the coprecipitation of the aqueous solution of $Zr(SO_4)_2$ $4H_2O$, $Y(NO_3)_3$ $6H_2O$ and $TaCl_5$ with ammonia. The obtained precipitates were dried and transformed to the oxides by calcination. The oxide agglomerates were milled. For the study of the equilibrium phase relations in the system $ZrO_2$-$Y_2O_3$-$Ta_2O_5$ the pellets were pressed isostatically at 170 MPa and fired on platinum foil at 1500° C. for up to 165 hours. Phase identification was performed using X-ray diffractometer (XRD) with CuK radiation.

Fracture toughness was determined by the fracture of polished four-point bend specimens of 2.5 by 3 by 30 mm containing three Vickers indentations on the tensile surfaces within the inner span at a crosshead speed of 0.5 mm/min according to procedures described by R. F. Cook et al, "A Modifed Indentation Toughness Technique", J. Am. Ceram. Soc., 66(11), C-200-01 (1983). Four-point bending strength was obtained from the fracture of the bend specimens at the same crosshead speed. The bend specimens were prepared from sintering of the powder, pressed isostatically at 170 Mpa, at 1500° C. for 1 hour.

The monoclinic fractions on the fractured surfaces of bend specimens were determined from XRD peak intensities of t (111), m (111) and m (111) reflections, see R. C. Garvie et al, "Phase Analysis in Zirconia Systems", J. Am. Ceram. Soc., 55(6) 303-05 (1972).

Transformation temperatures were determined using dilatometry. For the dilatometry study 2 mole % series samples were fired for 10 hours at 1500° C. and 3 mole % at 1550° C. in a super-Kanthal furnace. Using dilatometry, samples were heated to 1150° C. and cooled at a rate of 10° C./min. As and Ms temperatures were determined from the strting points of volume shrinkage and expansion of the sample during heating and cooling, respectively.

The critical grain sizes were determined from the sintering of composite powders containing 0, 0.15, 0.3, 0.5 mole % $Ta_2O_5$ in 2 mole % $Y_2O_3$ at 1500° C. for 30 minutes to 150 hours. The grain sizes retaining >95% of t phase were measured from scanning electron micrographs using a linear intercept technique, see M. I. Meadelson, "Average Grain Size in Polycrystalline Ceramics", J. Am. Ceram. Soc., 52[8], 443-46(1969).

The lattice parameter study was performed using XRD with CuK$_\alpha$ radiation. Peaks obtained over a 2 $\theta$ range of 26°–76° with scan rate of 0.25° (2$\theta$)/min were used to calculate precise lattice parameters using a LCLSQ refinement program. Si powder was used as an internal standard.

Part of the phase relations in the system $ZrO_2$-$Y_2O_3$-$Ta_2O_5$ at 1500° C. is illustrated in FIG. 1. The cubic fluorite phase region is consistent with the stability boundary reported by Choudhary and Subbarao, "Electrical Conduction in the Cubic Fluorite Phase in the System $ZrO_2$-$YO_{1.5}$-$TaO_{2.5}$", pp. 665–68 in Fast Ion Transport in Solids, Elsevier/North-Holland, New York, (1979). The ternary t-phase stability region extends to about 25 mole % $YTaO_4$ compound. In contrast to t-phase in the region up to about 12 mole % $YTaO_4$, t-phase in the composition range from 16 to 25 mole % $YTaO_4$ does not transform to m-symmetry during cooling and is insensitive to grain sizes.

In the t-$ZrO_2$+c-$ZrO_2$ region, the c-$ZrO_2$ fraction decreases with increasing $Ta_2O_5$ content at a given $Y_2O_3$ concentration as expected from lever rule.

The $Ta_2O_5$ alloying effect on fracture toughness is shown in FIG. 2. Three bend bar samples were used to determine the toughness for each composition. The phase on the sintered surfaces of the samples was identified as t-phase except one with 1.5 mole % $Ta_2O_5$ that showed a tiny amount of m-phase after sintering at 1500° C. for 1 hour. FIG. 2 shows that the toughness increases from 5 to about 12 MPam$^{\frac{1}{2}}$ as the $Ta_2O_5$ concentration in 3 mole % Y-TZP increases from zero to 1.5 mole %. Again, this remarkable increase in toughness is attributed to the enhanced transformability of the t-$ZrO_2$ due to $Ta_2O_5$ alloying. Quantitatively, the alloying effect on the transformability can be determined by measuring the m-phase fraction on the fractured surface of the bend specimens as shown in FIG. 3. The increasing trend of m-phase fraction as a function of $Ta_2O_5$ content is consistent with that of fracture toughness as shown in FIG. 2.

Figure 4:
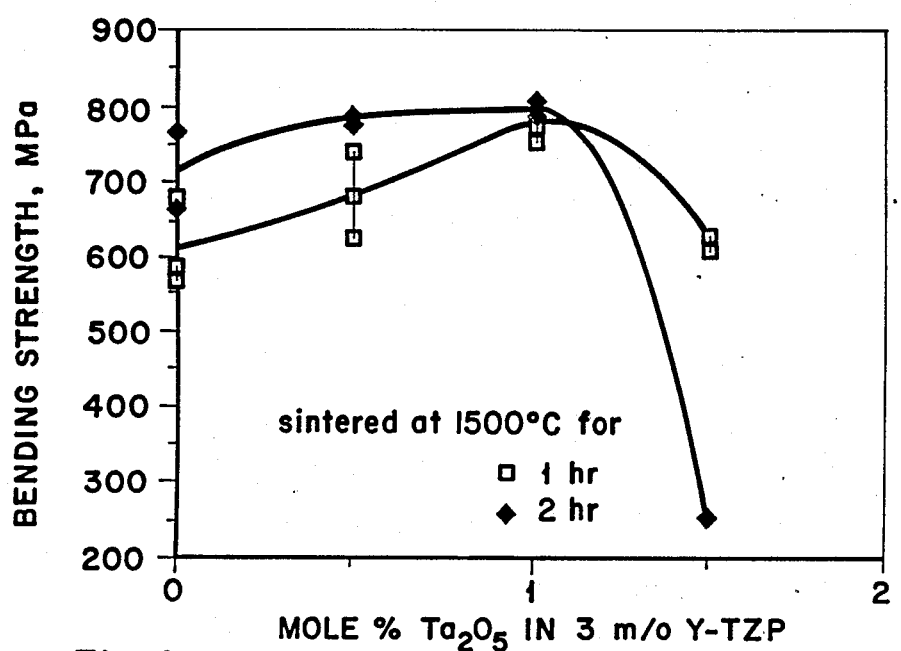
FIG. 4 is a plot of the bending strength of 3 mole % Y-TZP sintered for 1 hour and 2 hours at 1500° C. as a function of mole percent $Ta_2O_5$.

The $Ta_2O_5$ alloying effect on the bending strength of 3 mole % Y-TZP is shown in FIG. 4. The bending strength slightly increases with the addition of $Ta_2O_5$ up to 1 mole % and decreases with further addition of $Ta_2O_5$. This decrease in the bending strength of the samples with 1.5 mole % $Ta_2O_5$ is due to the presence of m-phase on the sample surfaces so that increasing sintering time, accompanied with a grain growth, causes a further drop of the strength due to increased m-phase as shown in FIG. 4.

Figure 5:
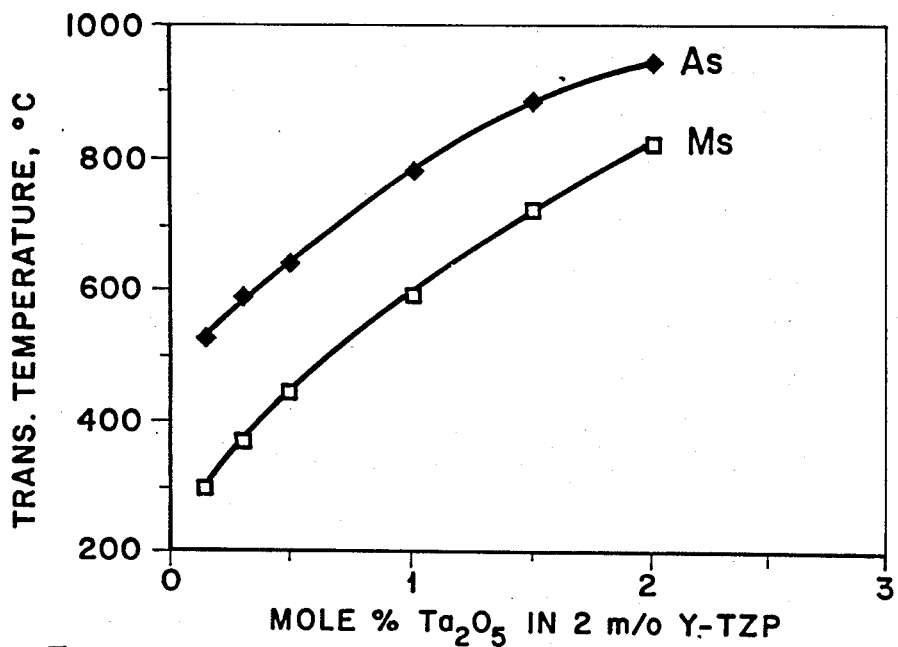
FIG. 5 is a plot of the reverse, As, and martensitic, Ms, transformation temperatures for 2 mole % Y-TZP sintered for 10 hours at 1500° C. as a function of mole % $Ta_2O_5$.

The reverse (As) and martensitic (Ms) transformation temperatures depend on the concentration of stabilizers and the grain or particle size of t-phase. The $Ta_2O_5$ alloying effect on the transformation temperatures of 2 moles % Y-TZP is shown in FIG. 5. The increase in $Ta_2O_5$ concentration increases both the As and Ms on Y-TZP.

Figure 6:
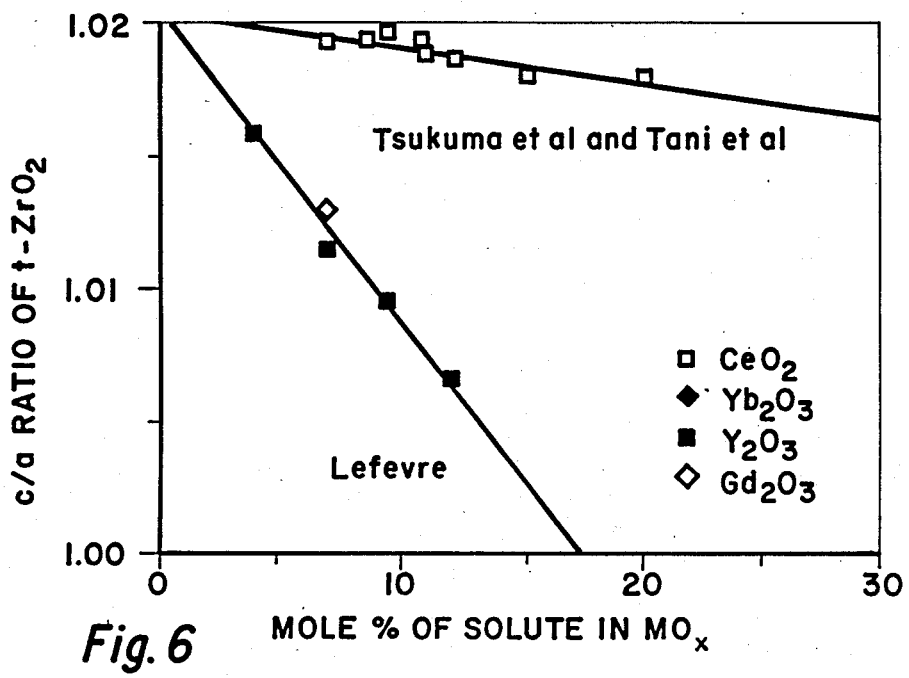
FIG. 6 is a plot of the lattice parameter ratio, c/a, of t-$ZrO_2$ stabilized with various solutes, $MO_x$, as a function of the mole % of solute.
Figure 7:
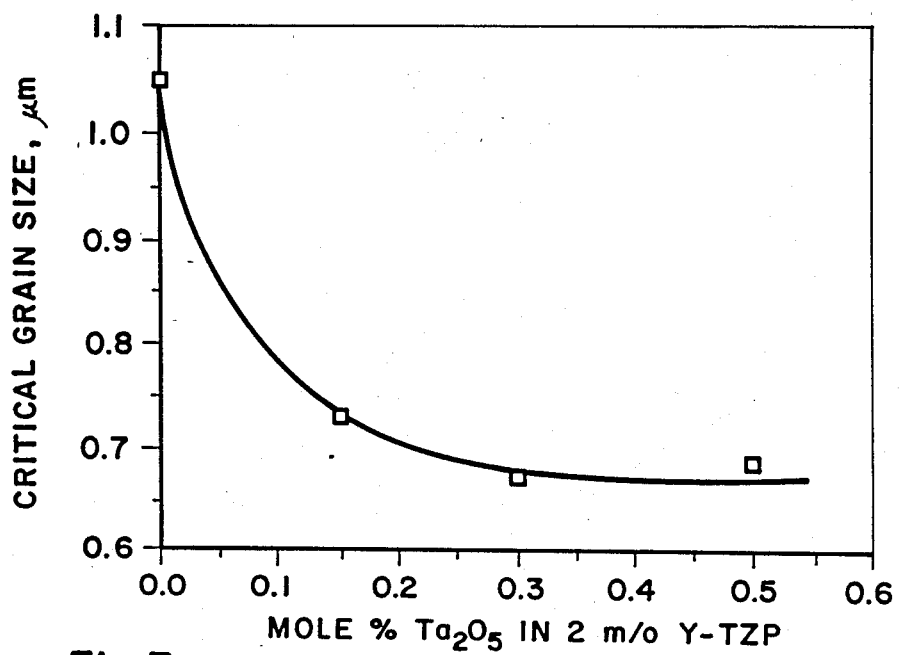
FIG. 7 is a plot of critical grain size for the t m transformation in 2 mole % Y-TZP as a function of mole % $Ta_2O_5$.

The effect of $Ta_2O_5$ alloying on Ms in FIG. 5 is opposite to that of $Y_2O_3$ alloying which decreases Ms. This contrary effect of $Ta_2O_5$ alloying as compared with $Y_2O_3$, a stabilizer, is evident in FIG. 6. In contrast to $Y_2O_3$ alloying which increases the critical grain size to larger values, the increase in $Ta_2O_5$ content on 2 mole % Y-TZP decreases the critical grain size as shown in FIG. 7. Thus, $Ta_2O_5$ may be termed as a destabilizer.

The $Ta_2O_5$ alloying effect on the transformation temperatures in 3 mole % Y-TZP is similar to $Ta_2O_5$ effect in 2 mole % Y-TZP. The results of the $Ta_2O_5$ alloying in 2 mole % Y-TZP are shown in FIGS. 8 and 9.

The addition of the trivalent t-$ZrO_2$ stabilizers such as $Y_2O_3$, $Yb_2O_3$, and $Gd_2O_3$ increases the t-$ZrO_2$ lattice constant in a axis and decreases the c axis. On the other hand, a tetravalent stabilizer such as $CeO_2$ increases the lattice constants in both a and c axes but the slope of the c axis parameter in the plot of the lattice parameters as a function of $CeO_2$ content is smaller than that of a axis parameter. Thus, the increase in both trivalent and tetravalent stabilizer content decreases the ratio of the room temperature tetragonal lattice parameters of c and a axes, c/a, as shown in FIG. 6. This decrease in c/a ratio of t-$ZrO_2$ with $Y_2O_3$ content is consistent with the increase in the stability of Y-TZP which is related to the difficulty of the t→m transformation.

Since the t-phase is the intermediate phase between c- and m-phases, the c-$ZrO_2$ will become stable when the c/a ratio approaches 1 and the m-$ZrO_2$ will be stable when the ratio is close to the c/b ratio of the m-symmetry from the lattic correspondences of the three polymorphs. This argument can be proved from binary phase diagrams between any stabilizer and $ZrO_2$ where c-$ZrO_2$ becomes stable whenever a stabilizer concentration exceeds that for t-$ZrO_2$ stability. For m-$ZrO_2$ stabilization the argument can be deduced from the fact that the hypothetical c/a ratio value of pure t-$ZrO_2$ at room temperature coincides with the c/b ratio of m-$ZrO_2$, that is 1.020, as discussed in the following section. Therefore, the changes in c/a ratio of t-phase with solute alloying can be used as a parameter to predict the stability of t-$ZrO_2$ solid solutions.

Figure 8:
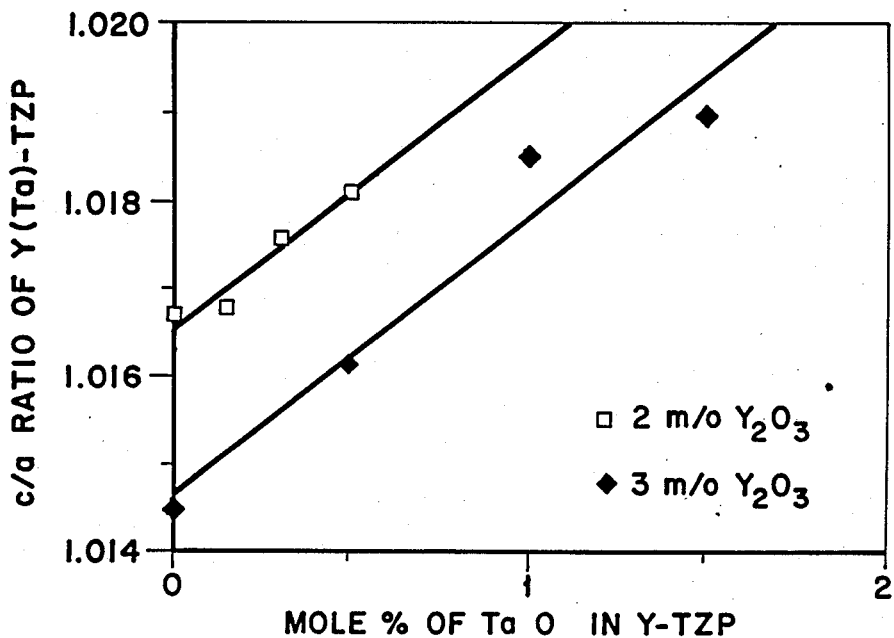
FIG. 8 is a plot of the lattice parameter ratio, c/a, for 2 mole % $Y_2O_3$ and 3 mole % $Y_2O_3$ Y(Ta)-TZP as a function of the mole % $Ta_2O_5$
Figure 9:
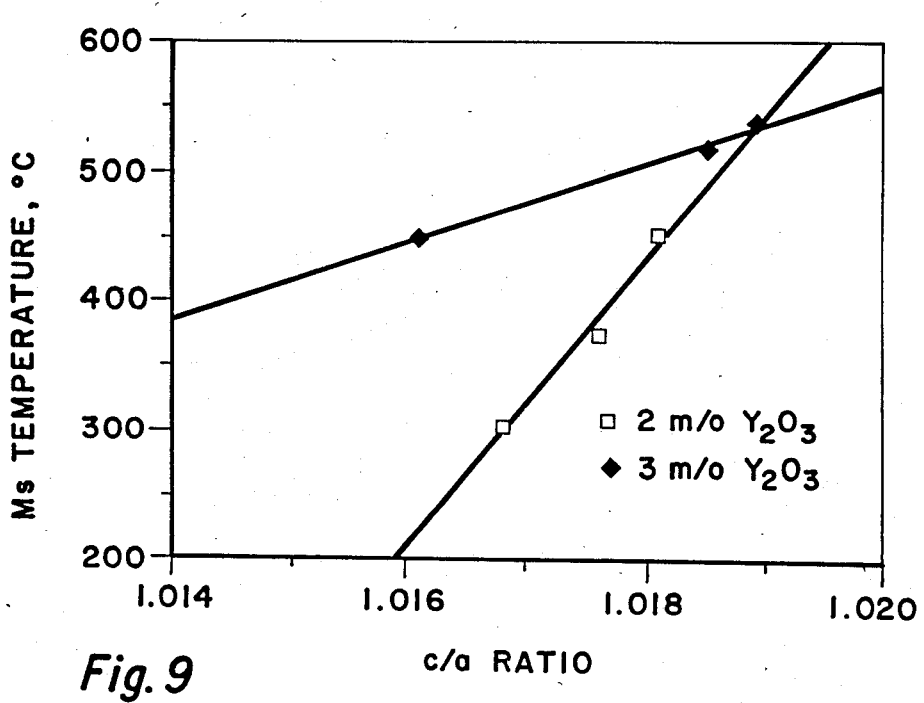
FIG. 9 is a plot of the martensitic, Ms, transformation temperature as a function of the lattice parameter ratio, c/a, of Y(Ta)-TZP for 2 mole % $Y_2O_3$ and 3 mole % $Y_2O_3$.

The addition of $Ta_2O_5$ into both 2 and 3 mole % Y-TZP increases the c/a ratio of t symmetry as shown in FIG. 8. The increase in the ratio decreases the stability of the Y-TZP as discussed above. This enhanced instability is evident in FIG. 9, where increasing the c/a ratio is related to the increase in Ms temperature. Therefore, the increased instability of Y-TZP due to $Ta_2O_5$ alloying causes the easy transformability and the increased fracture toughness.

The effect of $Ta_2O_5$ alloying on the transformability is related to its destabilizing effect which is illustrated by the increase in the equilibrium transformation temperature. Crystal structurally, the addition of $Ta_2O_5$ into Y-TZP increases c/a ratio of t-$ZrO_2$ solid solution which is opposite of what a stabilizer does. This increase in c/a ratio is correlated with the increase in Ms temperature of Y(Ta)-TZP.

The toughened ceramics according to the present invention are viewed as being particularly useful as substitutes for the previously known tetragonal zirconia polycrystals, particularly in applications where improved mechanical properties is important. As such, the materials can be employed in a variety of applications and environments.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A ceramic composition consisting essentially of: a major component consisting of $ZrO_2$ present at about 93 to 97.5 mole precent, a minor stabilizing component selected from the group consisting of $Y_2O_3$, MgO, $Sc_2O_3$, $IN_2O_3$ and rare earth oxides present at about 2 to about 4 mole percent; and a toughening agent selected from the group consisting of $Ta_2O_5$ and $Nb_2O_5$ present at about 0.5 to about 3 mole percent.

2. A ceramic composition of claim 1 wherein the stabilizing component is $Y_2O_3$.

3. A ceramic composition of claim 1 wherein the toughening agent is $Ta_2O_5$.

4. A ceramic composition of claim 2 wherein the toughening agent is $Ta_2O_5$.

5. A ceramic composition consisting essentially of $ZrO_2$, $Y_2O_2$ and $Ta_2O_5$ wherein for every mole of $ZrO_2$ there is present from about 0.01 to about 0.04 moles of $Y_2O_3$ and from about 0.005 to 3 moles of $Ta_2O_5$.

6. A ceramic composition of claim 5 wherein the $Y_2O_3$ is present at about 0.03 moles for every mole of $ZrO_2$ and the $Ta_2O_5$ is present at about 0.01 to about 0.015 moles for every mole of $ZrO_2$.

7. In a method for preparing a partially stabilized zirconia wherein a major component of $ZrO_2$ present at about 93 to 97.5 mole percent is stabilized by adding a minor component of a stabilizing agent selected from the group consisting of $Y_2O_3$, MgO, $Sc_2O_3$, $In_2O_3$ and rare earth oxides present at about 2 to 4 mole percent, to form a mixture and sintering said mixture, the improvement comprising the steps of adding about 0.5 to about 3 mole percent of a toughening agent selected from the group consisting of $Ta_2O_5$, $Nb_2O_5$ and $HfO_2$.

8. The improved method of claim 7 wherein the stabilizing agent is $Y_2O_3$ and the toughening agent is $Ta_2O_5$.

9. A method of improving the ease of transformability of the t→m phase in stabilizing t-$ZrO_2$ polycrystal comprising the step of adding an amount of a transition metal oxide sufficient to cause the ratio of the lattice parameters c/a to increase.

* * * * *